May 14, 1940.　　　T. R. McKINNEY　　　2,200,698
HANDLE
Filed Dec. 7, 1938
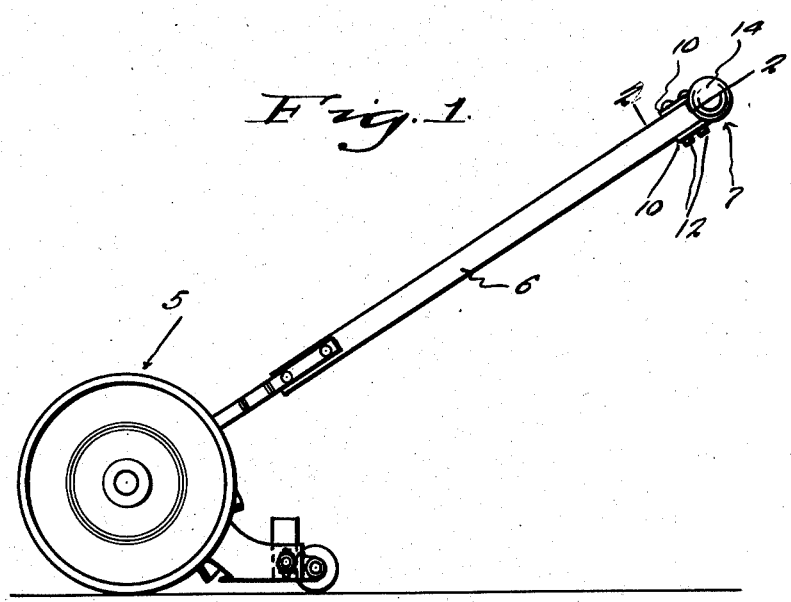
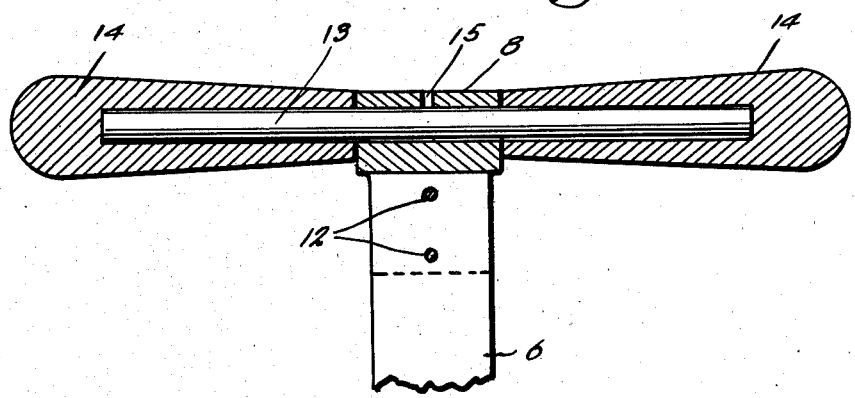
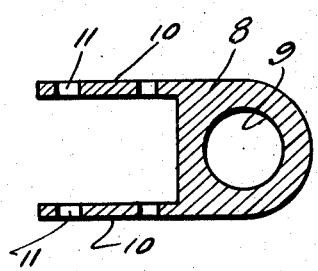
Inventor
Thurman R. McKinney
By Clarence A. O'Brien
and Hyman Berman
Attorneys Patented May 14, 1940

2,200,698

UNITED STATES PATENT OFFICE 2,200,698

HANDLE

Thurman R. McKinney, Shawnee, Okla.

Application December 7, 1938, Serial No. 244,491

1 Claim. (Cl. 16—111)

This invention appertains to new and useful improvements in handle structures and more particularly to a handle especially adapted for use on lawn mowers.

The principal object of the present invention is to provide a hand grip which is rotatably mounted for the purpose of preventing friction burns on the hands of the operator.

Another important object of the invention is to provide a hand grip of the character stated which is of simple construction and not susceptible to the ready development of defects.

These and other important objects and advantages of the invention will become apparent to the reader of the following specification.

In the drawing—

Figure 1 represents a side elevational view of a lawn mower equipped with the novel hand grip.

Figure 2 is a section on the line 2—2 of Figure 1.

Figure 3 is a longitudinal sectional view through the bearing structure.

Referring to the drawing, wherein like numerals designate like parts, it can be seen that numeral 5 represents a conventional lawn mower having the tongue 6 at the upper end of which is mounted the improved handle structure generally referred to by the numeral 7.

This handle structure consists of the bearing 8 having the bore 9 extending therethrough and from this bearing 8 extend the flanges 10—10 in parallel relation and formed with openings 11 through which securing means 12 is disposed for securing the bearing to the upper end of the tongue 6.

Numeral 13 denotes an elongated cylindrical shaft having its intermediate portion journaled through the bearing 8. Hand grips 14—14 are formed with inwardly extending bores for receiving the outer end portions of the shaft 13 and these hand grips 14 can be secured to the end portions of the shaft 13 in any suitable manner.

An oil opening 15 is provided in the bearing 8 so that oil can be injected into the bore 9 to permit free rotation of the shaft 13.

Thus it can be seen that as the mower is pushed there will be no tendency of the hands to slip around on the hand grips as the hand grips will rotate the shaft 13. Thus blisters and friction burns will be entirely eliminated.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

A handle structure for hand-bars comprising a barrel having a pair of parallel spaced tongues extending laterally therefrom and substantially tangentially, securing means, one end of the hand-bar being disposed between the tongues and said securing means being disposed through the tongues and said mentioned end of the hand-bar, a shaft journalled through the barrel and having its end portions protruding beyond opposite ends of the barrel, and a pair of handle members, one at each end of the barrel, said handles being bored to receive the protruding end portions of the shaft, said handles being sufficiently bored to result in termination of the inner ends of the handles in close proximity to the ends of the barrel.

THURMAN R. McKINNEY.